March 9, 1971 G. S. HOFF ET AL 3,570,006

MULTIPLE BRANCH TECHNIQUE

Filed Jan. 2, 1968 4 Sheets-Sheet 1

INVENTOR
GEORGE S. HOFF
MING-TZER MIU
BY Robert S. Zinn
ATTORNEY

MULTIPLE BRANCH TECHNIQUE

Filed Jan. 2, 1968

Priority Logic (Portion of K Reg.)

Link Flop

INVENTOR
GEORGE S. HOFF
MING-TZER MIU
BY Robert S. Zwin
ATTORNEY

MULTIPLE BRANCH TECHNIQUE

Filed Jan. 2, 1968 4 Sheets-Sheet 3

Fan-In Logic with Portion of Mem. Store Add. Reg.

Inc-Dcr. Conditioning Logic

Address Register Sampling and Recognition Logic

INVENTOR
GEORGE S. HOFF
MING-TZER MIU

BY Robert J. Lewin

ATTORNEY

INVENTOR
GEORGE S. HOFF
MING-TZER MIU
BY Robert S. Zinn
ATTORNEY 3,570,006
Patented Mar. 9, 1971

3,570,006

MULTIPLE BRANCH TECHNIQUE

George S. Hoff, Sudbury, and Ming-tzer Miu, Brighton, Mass., assignors to Honeywell Inc., Minneapolis, Minn.

Filed Jan. 2, 1968, Ser. No. 694,949
Int. Cl. G06f 9/10
U.S. Cl. 340—172.5 8 Claims

ABSTRACT OF THE DISCLOSURE

An apparatus for effecting a multiple branching operation wherein a multiplicity of branch addresses, with corresponding test conditions, are pre-established and the results stored pending the detection of a "branch-on-stored-test" signal to initiate the actual branching operation. To accommodate the branch on stored test operation, provisions are made for storing a multiplicity of branch addresses in corresponding branch address registers together with indicating means to establish the results of the test conditions and for storing an indication thereof prior to the actual branching operation.

BACKGROUND OF THE INVENTION

The present invention concerns a data processing apparatus, and more particularly, means for effecting a multiple branching operation within such a data processing apparatus.

Conventional programming techniques are available which enable a multiple branch operation to occur by cascading conventional branching instructions. This technique is known to be slow inasmuch as a tested branch instruction must be extracted for each element in the cascade. Multiple branching operations are also known which execute their operation within the equivalent of a single machine cycle. This latter type of multiple branching operation is also deficient in that the multiple addresses and test conditions are usually executed within a single instruction cycle so that the test conditions must all be generated and satisfied somewhat simultaneously. This is to be contrasted with the subject of the present invention which provides means for independently prestoring one or more branch addresses as well as indications of conditions being tested; and at a point subsequent in time, testing the results of the prestored conditions and effecting a branching operation to a corresponding one of the prestored address.

SUMMARY OF THE INVENTION

It is accordingly a primary object of the present invention to provide means for effecting a branching operation to any one of a plurality of prestored branch addresses corresponding to conditions existing within the associated data processing system and being tested at some point in time subsequent to the actual establishment thereof.

The foregoing object is achieved in the preferred embodiment of the present invention, wherein there is provided a plurality of storage registers, designated as branch address registers, capable of storing digital representations corresponding to an address or a portion of an address within an associated memory. Associated with each of the branch address registers is a settable bistable device in the nature of a flip-flop, each of which may be set as a result of the successful satisfaction of conditions existing within the system and upon which the branching operation is conditioned. Scanning means in the nature of test logic is also provided to be responsive to a test on stored branch signal generated within the control circuitry of the associated data processing system, and which, upon detection thereof, initiates a scanning of the bistable devices to ascertain which, if any, of the branch addresses is to be honored. In the preferred embodiment of the present invention, the order of scanning is predicated upon a priority basis with the direction of scanning of the flip-flops corresponding to a descending order of significancee.

Accordingly, a more specific object of the present invention concerns a multiple branching technique wherein branch addresses corresponding to any one of a plurality of conditions being tested are pre-established in branch address registers while the conditions being tested are registered in corresponding flip-flops whereafter the generation of a branch on stored test signal is effective in initiating the scanning of the flip-flops, with recognition being extended on a priority basis to the contents of a particular one of the branch address registers.

The added flexibility afforded by the branch on stored test operation should be readily apparent to those having ordinary skill in the data processing art. This applies both with respect to internal and external branch operations. More specifically, one particular application of the multiple branching technique is for use in sequencing through stored programs. Such stored programs may be in the form of a conventional stored program as utilized in conventional data processing equipment; alternatively, the program may, as in the case of the preferred embodiment of the present invention, form the substance of a read only memory used in the generation of control signals in an associated data processing apparatus. In this latter capacity, a projected use on a purely internal level might constitute an exercise in which the programmer wishes to execute an internal loop in which a limited number of read only memory locations are sequentially cycled until an associated register, incremented by one through each cycle, has a representation registered therein corresponding to the desired number of loops. At such time, the test condition for a flop associated with one of the branch address registers will be satisfied so that the next succeeding read only memory location to be referenced will be that corresponding to the address stored in the associated branch address register.

Exemplary of an external branch operation is a situation in which various ones of successive read only memory locations represent control signal generating cycles common to a plurality of programming orders but which constitute only a small percentage of the total number of cycles necessary to completely express any one of these operations. In such instances, the common cycles will be shared among the various program orders and an external branching operation will be introduced in order to redirect control for succeeding operative cycles of the respective orders to various other portions of the read only memory.

It is accordingly still another object of the present invention to provide a multiple branching capability for use in the implementation of a data processing apparatus whereby branching operations responsive to both internal and external conditions may be effected.

An explanation of the multiple branch instruction will be given in terms of an example of a program instruction in which both internal and external branch operations take place.

The foregoing objects and features of novelty which characterize the present invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

DESCRIPTION OF THE PREFERRED EMBODIMENT

Figure 1:
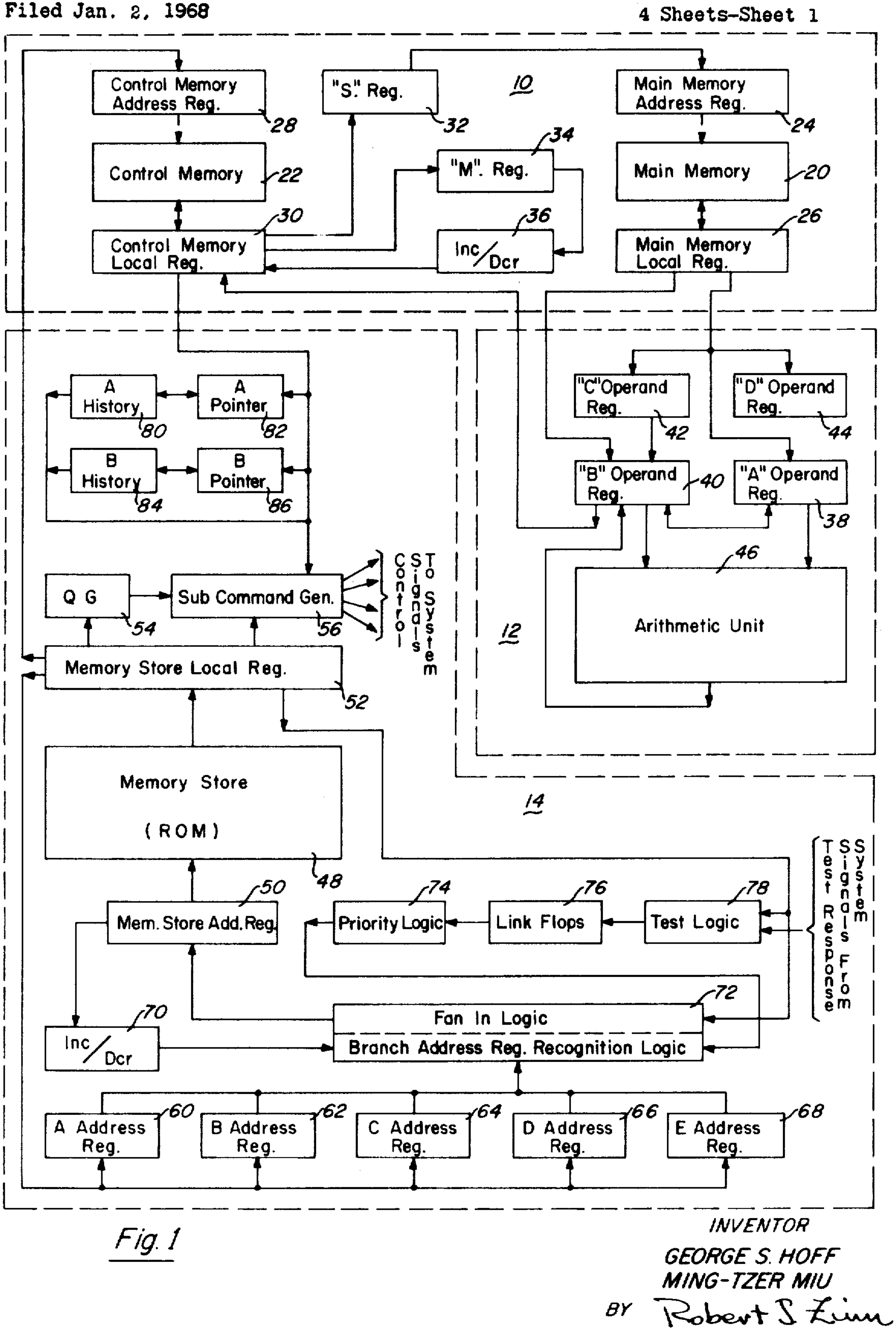
FIG. 1 is a diagrammatic showing of a computer system embodying the present invention.

Referring now to FIG. 1 therein is disclosed in block diagrammatic detail, the general design of an electronic data processing system embodying the features of the present invention. Giving general consideration initially to the overall composition of the system depicted in FIG. 1, it is seen that the central processing portion of the system may in general be thought of as comprising three parts; a memory portion 10, an arithmetic portion 12 and a control portion 14. A master clock, not shown, is employed to generate timing signals basic to the synchronization of all units within the system. Although not shown as such, signals from the master clock may be considered as being distributed to all of the pertinent members of the system as required in order to synchronize the operations thereof.

Considering in more detail the components comprising the memory portion 10 of FIG. 1, therein is disclosed a main memory 20 which may comprise a multiplane, coincident current, core storage unit of the form described in the patent to Henry W. Schrimpf bearing Pat. No. 3,201,762. Access to the main memory 20 from a control memory 22 may be provided by way of the multi-stage main memory address register 24; the latter of which stores the address of a location within main memory currently being referenced. Connected to the output of the main memory 20 is a main memory local register 26 adapted to receive and temporarily store the contents of a referenced main memory location.

Implemented in a manner similar to the main memory 20, the control memory 22 has associated therewith a control memory address register 28 as well as a control memory local register 30. The control memory 22 may comprise a plurality of multi-position storage registers connected in a conventional manner; each of which is adapted to store information pertinent to the processing of various program instructions. These storage registers contain the addresses of instructions and data being processed during a program run. In a preferred embodiment of the present invention there are included in the control memory register repertoire: A, B, C and D operand address registers, sequence and cosequence registers, present and starting locations registers associated with peripheral transfer operations, and special working location registers used for the temporary storage of information.

A signal representation of a main memory address, generated within the control memory 22, is transferred to the main memory address register 24 via the control memory local register 30 and a temporary storage, or S register 32. These addresses are also normally transferred to a second temporary storage register, or M register 34 associated with conventional increment-decrement logic 36. The incremented or decremented versions of the addresses are thereafter restored in control memory 22 for subsequent addressing purposes.

The arithmetic portion of the system 12 is comprised basically of a set of four operand storage registers 38, 40, 42 and 44 serving an arithmetic unit 46. The arithmetic unit 46 is in turn composed basically of an adder capable of performing both binary and decimal arithmetic and may take the form of such units as is described in the text of R. K. Richards entitled Arithmetic Operations in Digital Computers, D. Van Nostrand Company, 1955. The arithmetic portion is utilized in its conventional capacity to effect either numeric or logical operations on operands being processed in the associated data processing system.

An additional component, not featured among those components of the central processor shown in FIG. 1, but whose function is essential to a complete central processing system, is the input/output traffic control. As its name implies, the input/output traffic control regulates the flow of data between the central processor and input/output facilities by allocating central processor time to input/output operations, as well as identifying the peripheral controls which are to use that time in the transfer of data. Such a system is described in Pat. No. 3,323,110 which issued to L. Oliari and Robert P. Fischer, May 30, 1967.

The subject of the present invention concerns itself with the control portion, or control unit, of the central processor which in fact constitutes the hub of central processing activities. The major function of the control unit is to assist in the selection, interpretation and execution of the instructions constituting the stored program. In carrying out these activities, the control unit coordinates the various operations of: receiving data from input devices, transferring data from the central processor, and transferring processed data to the output units. As such, the control unit is responsible for generating and disseminating control signals to the gates and registers comprising the data processing system. At the same time, the control portion must be flexibly responsive to conditions existing within the data processing apparatus. The required flexibility is in great measure facilitated in the control portion of the central processor by way of the features characterizing the present invention.

Perhaps the key element in the control unit 14 is the memory store 48 which, in the preferred embodiment, comprises an addressable, electrically alterable, read only memory of some 2048 storage locations, each of which contains 120 bits of information. Each memory location in the read only memory store 48 is capable of being exclusively referenced by means of a memory store address register 50 of conventional design. The 120 bits comprising the output of the memory store 48 are temporarily stored in the memory store local register 52; the latter also being of conventional design. The memory store local register 52 may be construed as being further comprised of three distinct fields consisting of 12 bits, 22 bits and 86 bits respectively. The 12 bit field serves in a control capacity in that in one instance it is used as input data to a temporary storage register 54 identified herein as the QG register. The bits contained within the QG register 54 are used to provide a selective interpretation to the bulk of the contents of the memory store local register 52; namely the interpretation of the 86 bit field thereof, as effected in a subcommand generator 56. Each variation of the 12 bit field stored in the QG register 54 effects a different interpretation of the bit configuration transferred to the subcommand generator 56. Once established in the QG register 54, the 12 bit field normally remains fixed through the processing of the current stored program instruction.

In addition to serving an interpretative function for the content of the subcommand generator 56, the 12 bit field of the memory store local register 52 also serves to provide address information selectively to a plurality of address registers 60 through 68 during succeeding cycles of the control unit 14. The 22 bit field in the memory store local register 52 serves primarily to establish the read only memory branch control functions and for this purpose includes 17 bits directed to testing. The balance of approximately 86 bits are reserved for the generation of subcommands to be distributed to the various operative members of the data processing apparatus for the control thereof. These 86 bits may be further subdivided into two groups, one of which contains 30 bits which are selectively combined to produce some 40 or more mutually exclusive operations. The remaining 56 bits are interpreted in a dependent manned in accordance with the contents of the memory store local register 52, and as such are utilized to produce the balance of some 400 microcommands.

The memory store address register 50 utilizes as a source of address information either an incremented-decremented version of the preceding address as generated in the associated increment-decrement logic 70; or, in the case of a branch operation, one of the prestored addresses contained in registers 60 through 68.

Positioned in the transfer path between the temporary storage register 60 through 68 and the memory store address register 50, is fan in and address recognition logic 72 which is conditioned in part by signals from the 22 bit field of the memory store local register 52, as well as a masked version of response signals representing system conditions being tested. The latter signals reach the logic of member 72 after having first been processed through the test logic 78, link flops 76 and priority logic 74. An additional group of input signals to the test logic of member 78, as well as to the subcommand generator 56 is provided by the A history and A pointer registers 80 and 82 respectively, as well as the B history and B pointer registers 84 and 86 respectively. Clearer insight into the function served by the A and B pointer and history registers will be appreciated from the explanation of operation of the total system, as given below.

The functioning of the control unit 14 as outlined in FIG. 1 may best be appreciated by way of an example relating to its mode of operation in a typical branching routine. Assume that the control unit is being prepared for a branching operation. This preparation is effected in the normal exercise of the control unit functions. Thus, an address representation stored in the memory store address register 50 may reference any particular one of the approximate 2,000 locations in the read only memory 48 causing the contents thereof to be transferred into the memory store local register 52. It should be remembered that the read only memory store is sequenced a number of times for each program instruction to be executed. During the first of these read only memory cycles, the bit representation in the 12 bit field of the memory store local register 52 is transferred to the QG register 54 and stored therein during the balance of the particular program instruction being executed. This field conditions the subcommand generator 56 such that the latter assumes a particular one of a plurality of interpretations with respect to the 56 bits being directed thereto from the memory store local register. After being decoded in the subcommand generator, these bits are subsequently distributed as control signals to the various logical gates and registers comprising the associated data processing system.

An incremented or decremented version of the informational content of the address register 50 may be restored thereto from the increment-decrement logic 70 after the first operative cycle of the read only memory. This cycle may in turn bring up a bit representation which, in either the 86 bit field or the 22 bit field, contains a signal indicating that the low order 12 bits of the memory store local register 52 contains an address to be stored in one of the plurality of temporary storage registers 60 through 68. Appropriate control signals are thereupon generated to gate the information contents of the low order 12 bits into the designated one of the storage registers 60 through 68. At the same time, the balance of the informational contents of the memory store local register 52 are decoded in the subcommand generator 56 to provide additional control signals to the data processing system in a manner similar to that indicated above with respect to cycle 1.

During succeeding cycles, but not necessarily each successive cycle, additional information is extracted from read only memory 48 for temporary storage in the memory store local register 52 and from thence transferred to a designated one of the temporary storage registers 60 through 68.

Also during the succeeding cycles characterizing the operation of the control unit during the particular program instruction under consideration, signals generated from the bit representation in the 22 bit field of the memory local register 52 are effective in conditioning the test logic of member 78 in accordance with test conditions currently existing within the data processing system. These test conditions are also indicated as separate inputs to the test logic of member 78.

Immediately associated with the test logic 78 are link flops 76 which may comprise a plurality of bistable device or flip-flops, each of which acts to store the results of a particular condition being tested. A different one of the flip-flops 76 is associated with each of the branch address registers 60 through 68. The setting of the bistable devices or link flops is an indication of the satisfaction of conditions being tested in the associated test logic 78. In addition these signals coidition the priority logic 74 in a manner which enables the contents of the particular one of the branch address registers 60–68 associated with the highest order set link flop contents to be transferred through the address register recognition and fan in logic of member 72 to the memory store address register 50. This occurs upon receipt in member 72 of a branch on stored test signal emanating from the memory store local register 52. At this time, the contents of the selected address register 60 through 68 is transferred into the memory store address register 50 and thereafter used in a succeeding cycle in referencing the memory store 48. When the test conditions associated with any of the link flops whose corresponding branch address register had been preloaded, fail to be satisfied upon the generation of a branch on stored test signal in the memory store local register 52, the address for the corresponding memory store cycle will be supplied by the increment-decrement logic 70.

Figure 2C:
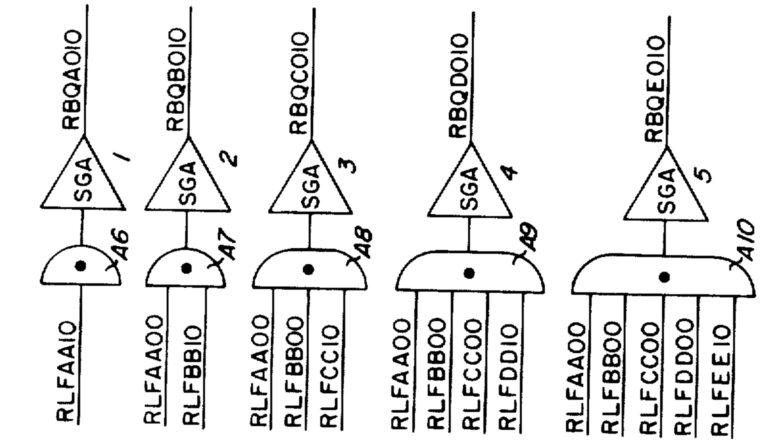
FIGS. 2A through F disclose detailed logic for implementing the present invention.
Figure 2A:
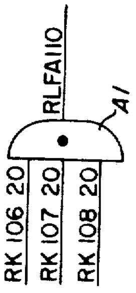

Reference is now made to FIGS. 2A through F which disclose detailed logical structure relating to the implementation of those portions of the control unit 14 pertinent to the present invention. In this respect, FIG. 2A depicts the conditioning logic associated with the output signals representing bit positions 106, 107 and 108 of the memory store local register 52 (i.e. K register) of FIG. 1; these being identified as signals RK10620; RK10720 and RK10830 respectively. The "2" related to the second lowest order position of signals corresponding to bit positions 106 and 107 represents the negation or absence of a signal in those bit positions, while the "3" associated with the corresponding position of the signal from bit position 108 indicates an affirmative condition for the latter signal. When the bit representation in the respective bit positions of the memory store local register 52 satisfies these conditions, AND gate A1 of FIG. 2A is conditioned to generate an output signal RLFA110 which forms a conditioning signal for the next higher level of logic; i.e. that depicted in FIG. 2B.

Figure 2B:
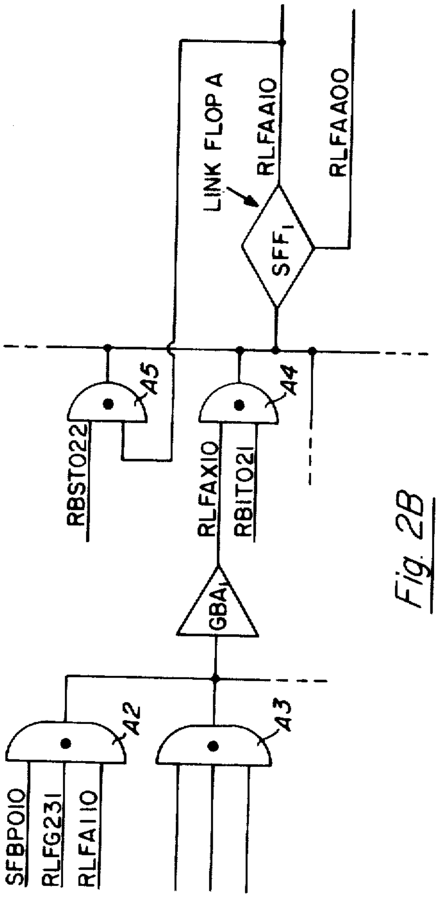

FIG. 2B combines portions of the test logic 78 with that of the link flops 76 of FIG. 1. In this respect, signal SFBP010 applied to AND gate A2 is representative of a test condition generated within the associated data processing apparatus. This signal is combined in the AND gate A2 with a signal RLFG231 representing one of a plurality of groups of signals joined so as to represent a particular strobe condition. The other conditioning input to AND gate A2 represents the signal generated at the output of the AND gate A1 of FIG. 2A.

The output of AND gate A2 is buffered through an amplifier GBA1 with the output of AND gate A3; the latter would be conditioned by other test conditions and strobing signals. Additional AND gates in the nature of A2 and A3 may also be buffered to the input of GBA1 to represent the results of other test conditions existing within the associated data processing system. The output of GBA1 is in turn connected as a signal RLFAX10 forming the input to AND gate A4 along with a strobing signal RBIT021.

AND gate A4 forms the input to link flop A which may be assumed to be associated with the A address register 60. As such, the output of AND gate A4 is buffered into flip-flop SFF1 which generates a signal RLFAA10 when in its set state, and generates a signal RLFAA00 is in its reset condition. It is significant to note that the balance of the address registers 62–68 of the control unit 14 of FIG. 1 would have analogous flip-flops and gating circuitry associated would be identified as link flops B, C, D and E. These additional link flops would be independently responsive to signal combinations from the memory store local register 52 and the results of test conditions in an associated data processing system, in a manner similar to that indicated for link flop A.

The affirmative output signal RLFAA10 indicative of link flop A being set is fed back into AND gate A5, the latter functioning as a recirculation gate to maintain link flop A set until a branch on stored test signal has been generated whereafter all link flops are reset. As a result, until the branch on stored test signal appears, the recirculation continues and link flop A remains in its set condition. This has the effect of storing the results of the test conditions indefinitely; i.e. until the appearance of a branch on stored test signal, to complete the branching operation. What should be apparent here is that the establishment of the branch address, the generation of the test conditions, the storing of the test conditions, and the initiation of the actual branching operation are all asynchronously independent with respect to time.

As was noted above with respect to FIG. 1, the function of the priority logic 74 is such as to establish an ordered recognition of the plurality of branch addresses being generated for a succeeding referencing cycle of the read only memory. In the preferred embodiment of the present invention, the order of priority is extended first to the A address register 60 (i.e. A address register has the highest priority) and then, provided that the test conditions therefore are not satisfied, i.e. the A link flop is not set, to the first one of the B, C, D, or E address registers 62–68, in that order, whose test conditions are satisfied. Thus, with respect to FIG. 2C, the conditioning of AND gate A6 is dependent only upon the presence of an affirmative signal RLFAA10. When conditioned, the AND gate A6 establishes an input to the amplifier SGA1 which in turn generates a signal RBQA010 at its output. In regards to the conditioning of AND gate A7, two conditioning signals are required including an affirmative signal RLFBB10 from link flop B and a negation signal RLFAA00 indicating the absence of an affirmed signal at the output of link flop A. In like manner, each of the remaining AND gates A8 through 10 requires as a conditioning signal in addition to the affirmative signal from the respective link flop, a negation signal from each of the higher order link flops.

Figure 2E:
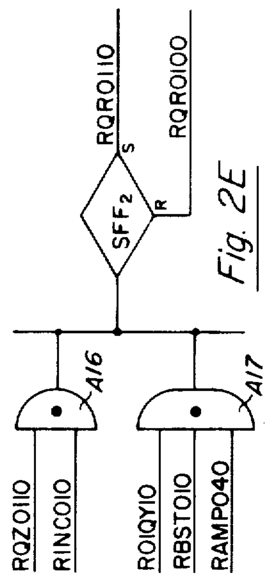
Figure 2F:
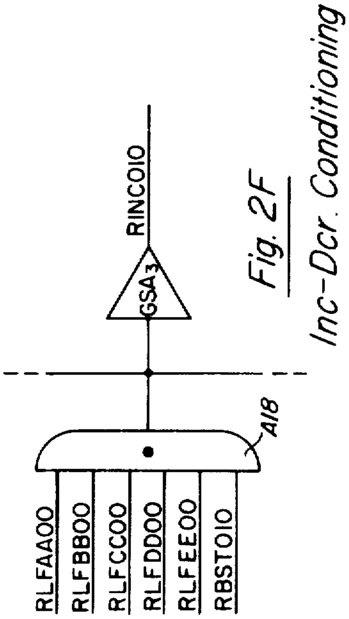
Figure 2D:
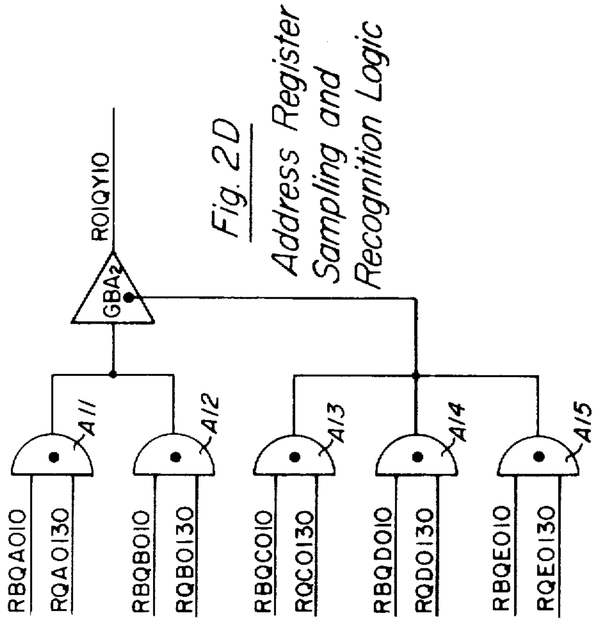

FIG. 2D discloses the address register sampling and recognition logic of member 72 of FIG. 1. In this respect, each of the AND gates A11 through A15 of FIG. 2D is conditioned by a pair of input signals including a signal representative of the affirmative output of the priority recognition logic of the associated link flop as well as a signal representing a particular bit position of the address registers 60 through 68. Thus, the logic of FIG. 2D depicts the gating circuitry associated with the first bit position of each of the registers 60 through 68. With respect to AND gate 11, when link flop A is set and priority recognition is extended thereto, and when the first bit position of the A address register 60 is set, the gating conditions are satisfied, thus resulting in an output from GBA2 as a signal R01QY10. It should be readily apparent that only one of the AND gates A11 through A15 will have all of the conditions at its input satisfied at any one time inasmuch as the mutually exclusive nature of the priority signals generated in the logic 74 preclude an alternative result.

FIG. 2E in part depicts the fan in logic of member 72 while further disclosing one stage of the memory store address register 50 of FIG. 1. The output of FIG. 2D is used as a conditioning input to AND gate A17 of FIG. 2E, along with a signal RBST010 indicating that a branch on stored test signal has been generated. The third signal to the input of AND gate A17 namely, RAMP040, is incidental to the present operation inasmuch as it pertains to maintenance operations and as such indicates the absence of maintenance operations in the present instance. The output of AND gate A17 is buffered into flip-flop SFF2 thus setting the latter and resulting in an output RQR0110 in a situation where all conditions at the input of AND gate A17 are satisfied. As indicated above, the flip-flop SFF2 constitutes a part of the read only memory address register 50 and in fact corresponds to the first or low order bit position thereof.

An alternative means of conditioning the flip-flop SFF2 there is also indicated in FIG. 2E an AND gate A16 conditioned by a pair of signals RQZ0110 and RINC010. The signal RQZ0110 represents an incremented or decremented interpretation of the past history of the corresponding bit of the memory address store register 50. The signal RINC0110 used in conditioning AND gate A16 of FIG. 2E, is generated in the logic of FIG. 2F. In this respect, it should be readily aparent that the gating structure of FIG. 2F represents the combination of a priority determination signal and a branch on stored test operation signal. The conditioning signals to AND gate A18 are effective in conditioning the latter whenever a branch on stored test operating signal comes up and the results of all the prestored test conditions are negative, i.e. none of the link flops associated with the address registers 60–68 are set. In essence, this means that the increment decrement logic will be effective in supplying an incremented version of the preceding address in an instance where a branch on stored test cycle is initiated and all the prestored test conditions are found to be negative. Means are thus provided to enable the use of an incremented or decremented version of the contents of the memory store address register, in the absence of a branch on stored test cycle.

Further insight into the functional capabilities of the present invention will be facilitated by way of the following explanation involving a typical program instruction, the execution phase of which makes extensive use of the subject branching operation. This explanation will be given in terms of the various memory cycles and control signals which define the execution phase of the instruction, these being depicted in the diagrammatic representation of FIG. 3. The interpretation of the flow chart of FIG. 3 will be further facilitated by the following glossary which more fully defines the logical functions utilized therein.

GLOSSARY

Register

R—Control Memory Address Register
Y—Control Memory Local Register
N—Main Memory Local Register
S—Transfer Register, Control Memory to Main Memory Address Register
M—Transfer Register, Control Memory to Increment Decrement Logic
A, B, C, D—Operand Registers Associated w/ Arithmetic Unit
AC—A operand Register in Control Memory
AccY—Accumulator Register in Control Memory
CM—Currently Addressed Control Memory Location
AP, AH, BP, BH—A & B History & Pointer Registers
$WL_3$, $WL_6$—Working Location Registers 3 & 6 in Control Memory QA, QB, QC, QD, QE—A through E Address Registers
LA, LB, LC, LD, LE—Link Flops A through E respectively Operations ASRC, BSRC—Shift Contents of A & B Operand Registers Right One Character Position
$B_L$ Y—Lower Order 3 Character Positions of B Operand Register Shifted to Memory Local Register
$A_4$ $B_1$—Shift Contents of 4th Character Position of A Operand Register to the 1st Character Position of B Operand Register
CMW—Write Into Control Memory
MMR—Main Memory Reference Cycle
BST—Branch on Stored Test
OABPO—Set Link Flop A if B Pointer Register Equals Zero.

Figure 3:
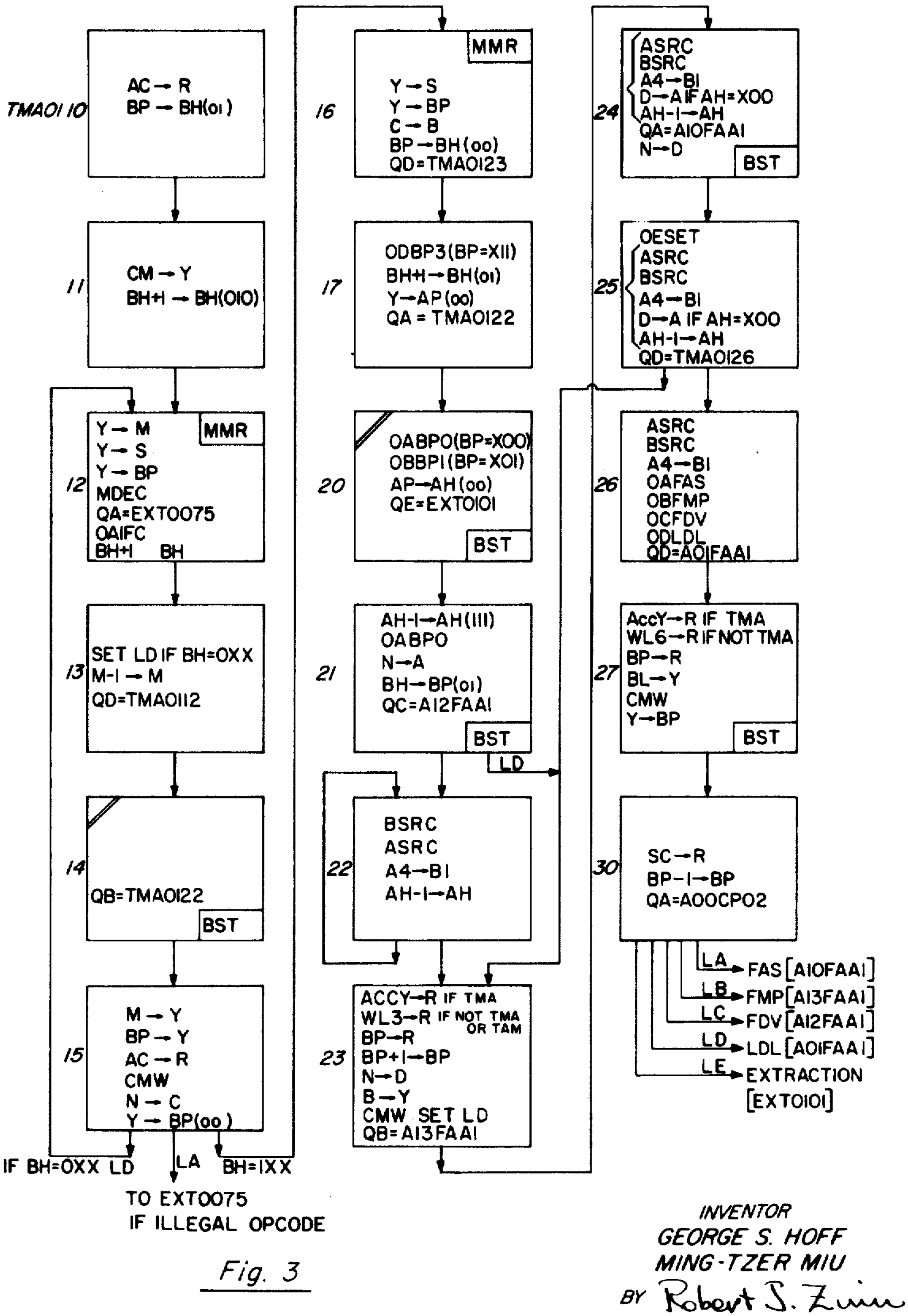
FIG. 3 depicts the flow diagram of a program instruction used in explanation of the operation of the present invention.

The read only memory cycles depicted by the individual blocks of FIG. 3 are common to five different program instructions; however, in an effort to preserve continuity of expression, an explanation will be given relating the various cycles to the execution of a particular instruction except insofar as the explanation of the multiple branch operation itself is concerned. The program instruction or order concerned with is the Transfer Memory to Accumulator or TMA order which performs the function of transferring 8 characters of information from a location in main memory 20 of FIG. 1 to an appropriate location within the control memory 22. In the preferred embodiment of the present invention, main memory 20 is oriented on a word basis, comprising 24 information bits per location. At the same time a character of information is defined as comprising six information bits. Thus, each main memory word location contains an equivalent of four characters of information.

The various register locations in the control memory 22 are each capable of accommodating 3 characters of information, the first character of which may be located in any one of the four character locations defining a main memory word. As a result, it may be necessary to reference 3 main memory locations in order to access the desired 8 characters to be transferred into control memory. Accordingly, the TMA instruction is so implemented, in terms of read only memory cycles, to effect the temporary transfer into storage of three main memory words from whence the desired 8 characters may be selected and transferred for storage in control memory.

The overall operation of a data processing apparatus under the control of a program instruction is initiated with the extraction phase whereby the various parameters defining the operation to be performed are loaded into appropriate registers of the associated data processing system. Thereafter, the actual execution of the program instruction is initiated during which an interchange of the informational contents of the various registers loaded during the extraction phase is effected. The explanation of the present invention in terms of the TMA order assumes that the various steps of the extraction phase have already been accomplished. This would include the identification of the current order as that of a TMA as well as the loading of pertinent registers with control information including the operand address registers of control memory and the special registers of the system which temporarily store control information.

As a preliminary consideration to the initiation of the extraction phase of the TMA order, or in fact any order in the data processing apparatus embodying the present invention, the B pointer register 86 has a binary one stored therein. The first read only memory (ROM) cycle, depicted as cycle TMAO110 in FIG. 3, is effective in transferring the address (AC) of the A operand register of control memory to the address register (R) thereof. Also during cycle TMAO110, or more simply cycle 10, the contents of the B pointer register 86 (BP), currently a binary one, are transferred to the B history register 84 (BH).

During cycle 11, the contents (CM) of the A operand address register of control memory, as referenced during the preceding cycle, are transferred to the control memory local register 30 (V). At the same time, the contents of the B history register 84 (BH) are incremented by unity so as to establish a binary two representation therein.

ROM cycle 12 constitutes the first cycle of a loop implemented by way of an internal branch operation. In this respect, during cycle 12, signals generated at the output of the read only memory 48 and the sub-command generator 56 are effective in initiating a transfer of the current contents of the control memory local register 30 (Y) to the M register 34 preparatory to the performance of an increment-decrement operation therein. At the same time, the contents of the control memory local register (Y) (currently containing the main memory address of the first of the three words to be extracted) are transferred to the S register 32 preliminary to the subsequent transfer thereof to the main memory address register 24. In addition to the bit representation of the control memory local register (Y) being used to address main memory, there currently remains in the control memory local register a two-bit data field which identifies a particular one of the four characters of the memory word being referenced as the initial character of the 8 bit field to be transferred into control memory. These two bits are transferred from the control memory local register Y during ROM cycle 12, and temporarily stored in the B pointer register 86.

Also occurring during ROM cycle 12 is an interchange of the current contents of the B history register 84 (BH) with an incremented version thereof. Accordingly, the representation in the B history register 84 (BH) at the conclusion of ROM cycle 12 will appear as a binary coded three (011). It is the function of the binary history register in the current looping operation to keep track of the number of cyclic executions thereof. In this respect, during the subsequent read only memory cycle, cycle 13, a comparison is to be made between the current content of the B history register, BH, with a representation 0XX. The XX indicates insignificant digits insofar as the comparison operation is concerned. As long as an 0 is present in the third highest order bit position, the comparison is satisfied and a designated link flop associated with a particular one of the address registers 60 through 68 will be set. The address register itself will have been somewhat simultaneously loaded with the read only memory address corresponding to cycle 12. As will be more apparent from the explanation which follows, subsequent encountering of a branch on stored test signal (BST) will complete a particular cycle of the looping operation in that the contents of the predetermined one of the address registers 60 through 68 will be transferred into the memory store address register 50 to initiate a new cycle of the looping operation.

Also involved in each execution of read only memory cycle 12 is the initiation of a decrement operation to the contents of the M register 34; the contents thereof being transferred thereto from the control memory local register 30 during the current read only memory cycle. Also occurring during this cycle is the storing in the A address register 60 (QA) the address (i.e. EXT 0075) corresponding to the first of a sequence of read only memory locations directed to action to be taken in case of the detection of an illegal OP code in the current instruction. Such action will be initiated at the generation of a branch on stored test signal during a subsequent read only memory cycle.

During read only memory cycle 13, the above mentioned BST test is initiated in which the contents of the B history register (BH) are compared with a representation 0XX to ascertain whether a subsequent looping cycle is to occur. For purposes of this explanation, we assume that link flop D and the associated D address register 66 are designated to store the results of the test and the address respectively. Also during ROM cycle 13, the decremented version of the contents of the M register are stored therein for subsequent restoring in control memory 22.

ROM cycle 14 is used to generate a signal used to initiate the execution of a branch on stored test operation which, as indicated in FIG. 3, is effective after completion of ROM cycle 15. The fact that a complete cycle is chosen to separate the initiation of the BST operation and the response thereto should not be construed as a limitation on the system inasmuch as it is merely a matter of design as to whether the actual branch is effective during the next immediate cycle or one or more cycles thereafter. Thus, it is that in the preferred implementation of the present invention, the branch on stored test signal is generated to be effective after the next succeeding ROM cycle to transfer control to the location in read only memory established by the contents of the highest priority address register 60 through 68 whose associated link flop is set, or alternatively, to the incremented or decremented version of the preceding ROM address. Assuming no illegal OP code was detected (i.e. link flop A is still in its reset state) and that no higher order link flop was set, the next succeeding read only memory cycle will be that designated by the contents of the D branch address register 66 which for this particular example is deemed to specify the address of the read only memory location corresponding to cycle 12.

Note also that with respect to cycle 14, the B address register 62 (QB) is loaded with information defining the ROM address of the read only memory location corresponding to cycle 22. The fact that the B address register is being loaded during cycle 14 is independent of the fact that the branch on stored test signal is likewise being generated during that cycle inasmuch as link flop B has not been set. Independent of the setting or resetting of any link flop is the consideration that an address, once loaded into one of the address registers 60 through 68, will remain effective until a new address is substituted therefor.

Prior to the actual execution of the internal branch operation, read only memory cycle 15 is executed which finds the decremented version of the contents of the M register 34 being restored to appropriate locations of the Y register along with the contents of the B pointer register 86 (BP). In addiion, the contents of the main memory, extracted during the preceding read only memory cycle and temporarily stored in the main memory local register 26 (N), are transferred to the C register 42.

As mentioned above, the initiation of the branching operation upon generation of the branch on stored test signal during cycle 15 results in an internal branch operation which, provided that link flop D is set and link flop A is reset, further results in the transfer of the contents of the D address register 66 to the memory store address register 50 with the consequent return of effective control to the read only memory location corresponding to cycle 12.

Note also that the particular implementation of the present system is such that a speed differential exists beween read only memory cycles and main memory cycles in the order of 6 to 1. Thus, a request, such as occurred during the preceding cycle 12 for the contents of a specified main memory location will be satisfied some 6 read only memory cycles later. It is thus that during cycle 15 of the first pass through the loop, the contents of the main memory local register 26 being transferred to the C register 42 are disregarded. However, during the second pass through the loop and particularly in the corresponding cycle 14 thereof, the contents of the main memory location referenced during the next preceding cycle 12 become available to the N register 26 and during the following control memory cycle (i.e. cycle 15) these contents are transferred from the N register 26 to the C register 42. This then constitutes the fetching of the first of the 3 words to be operated on in the TMA instruction.

It should also be noted that during the second pass through the loop, and particularly in cycle 12 thereof, a second request to main memory is generated which will be satisfied some 6 read only memory cycles later. If the looping operation were to continue, this would occur during cycle 14 of the succeeding looping cycle thereof; however, during the cycle 12 of the second pass through the loop, the B history register (BH) is once more incremented so that it thereafter contained a binary coded representation 100 which in cycle 13 results in link flop D remaining reset. Under these conditions, the generation of a branch on stored test signal in cycle 14 will find none of the link flops corresponding to the address register 60 through 68 set so that the increment decrement logic 70 will provide the next succeeding read only memory address; namely, that of cycle 16.

During cycle 16, another request to main memory is initiated by the transfer of the contents of the Y register to the S register whereby the fetching of the third word is initiated. At the same time, the character designating contents of the Y register are transferred to the B pointer register 86 (BP) as in cycle 12. Also, during cycle 16 the first of the three words, fetched from memory during cycle 14 and transferred from the main memory local register 26 to the C register 42 during the preceding cycle 15, is now transferred to the B register 40. At the same time the D address register 66 (QD) is loaded with the read only memory address (i.e. TMAO123) of cycle 23.

In continuing our explanation of the present invention, and particularly an operation involving a branch on external condition, it is well to keep in perspective the function being served by the TMA order itself. In this respect, the first of three multi-character words has already been extracted from main memory and is presently stored in the B register 40. Since the first of the 8 characters to be transferred to the control memory 22 may constitute any one of the 4 characters contained in the B operand register 40, we are now concerned with the selection of that first character and preparations for its transfer. It will be recalled that the character designating portion of the addressing information originally stored in the control memory 22 was transferred to the B pointer register 86 (BP). Thus, in cycle 17 link flop D is set if the B pointer register 86 (BP) is found to have a binary coded (i.e. 111) three representation therein. Also during cycle 17 the B history register 84 which previously contained a binary coded zero (i.e. 00) representation therein is incremented so as to register a binary coded one (i.e. 01) representation. The contents of the A address register 60 (QA) are replaced by the read only memory address corresponding to cycle 22. It will be recalled that the A address register 60 (QA) previously contained a read only memory address to be referenced in case of an illegal OP code. This latter condition was checked during the execution of the first branch on stored test operation and at this point in the execution of the current order is considered to be superfluous information.

Moving on now to the next cycle, i.e. cycle 20 (octal notation), link flop A is set if the B pointer (BP) contains a binary coded zero (i.e. 00) representation in the lower 2 bits thereof. In like manner, the link flop B is set if the B pointer register (BP) contains a binary coded one (i.e. 01) representation in the lower order 2 bits. The setting of the A and B link flops during cycle 20 is effected somewhat simultaneously with the generation of a branch on stored test signal in the memory store local register 52. However, link flops A and B and their associated address registers 60 and 62 are not affected by the current branch on stored test operation. Accordingly, a branch to the read only memory location corresponding to cycle 23 will be effected if the link flop D had been set during cycle 17, indicating that a binary coded three (i.e. 11) representation was currently being stored in the B pointer register. The binary coded three (i.e. 11) notation in the B pointer register 86 (BP) indicates that all four of the characters comprising the first word to be extracted from main memory are to be transferred to the control memory as useful information. In other words, the desired 8 characters are exactly contained in the first two main memory words to be referenced. Under these circumstances, the execution of the branch on stored test operation initiated in cycle 20 will result in an immediate transfer to cycle 23 after the read only memory sequences through cycle 21.

The contents of the main memory location referenced during the second loop through cycle 12, becomes available during cycle 20 in the main memory local register 26. In addition, cycle 20 also finds the E address register 68 (QE) being loaded with information (i.e. 010) defining a read only memory address to be cycled to during the execution of the branching operation which culminates the present order. Cycle 20 also finds the contents of the A pointer register 82 (AP) being transferred to the A history register 80 (AH) as a binary coded bit representation 00; this bit representation having been loaded into the former from the Y register during the preceding read only memory cycle.

Cycle 21 finds a signal (i.e. 0ABP0) being generated to maintain the link flop A set if the B pointer 86 (BP) then registers a binary coded zero. Just as the setting of the A and B link flops during cycle 20 corresponds to the branch on stored test operation initiated in cycle 21, the setting of the link flop A during cycle 21 corresponds to the branch on stored test operation being conducted during cycle 22. Thus, the branch on stored test operation initiated with cycle 21 is effective in initiating an abbreviated loop operation through cycle 22 for either a B pointer representation of 00 or 01; while a binary coded representation of 10 in the B pointer register (BP) will result in a normal sequencing through cycle 22 into cycle 23. It will be recalled that a binary coded bit representation of 11 in the B pointer register 86 (BP) causes a branch directly from cycle 21 to cycle 23 bypassing cycle 22.

Assume that the B pointer 86 (BP) originally contained a binary coded 00 representation, it is apparent that at the time cycle 21 is entered the A link flop will be once more set such that a first pass through cycle 22 will be effected as a normal consequence of the increment decrement logic; a second pass through the cycle 22 will be effected in response to the satisfaction of the test condition of link flop A as established during cycle 20 corresponding to the branch on stored test signal of cycle 21; and a third loop through cycle 22 will occur in response to satisfaction of the conditions for the setting of link flop A as established in cycle 21 and as a consequence of the branch on stored test signal generated in cycle 22.

As a final consideration assume that the B pointer register 86 (BP) during cycle 20 contains a binary coded representation 01 resulting in the setting of the B link flop by a signal 0BBP1 and initiating a single loop through cycle 22 in addition to that which follows as a normal consequence of the increment decrement logic.

Having now established the circumstances under which one arrives at read only memory cycle 23, there remains the necessity to explain the nature of the operations conducted during the balance of cycles 21 and 22. In this respect, the information transferred into the main memory local register 26 (N) from the memory 20 during the preceding cycle 20, is transferred to the A operand register 38 during cycle 21. In addition, a binary coded 01 representation is transferred from the B history register (BH) to the B pointer (BP). Also, a decremented version of the contents of the A history register (AH) is stored therein. In light of preceding operations, the representations stored in the A history register (AH) constitutes a binary coded 3 (111). In addition, a read only memory branch address (i.e. A12FAA1) is established in the C address register 64 (QC), and as such is pertinent to the branch operation concluding the current instruction.

The function of cycle 22 is to effect the initial shifting of the information presently contained in the A and B operand registers 38 and 40 preparatory to the transfer thereof to the control memory 22. In this respect, the transfer capabilities of the preferred embodiment of the present invention are such that the information must be positioned within the low order 3 character positions of the B operand register 40 prior to transfer to the control memory 22. Thus, during each loop through cycle 22 the contents of the B operand register 40 are shifted right one position as are the contents of the A operand register 38. At the same time, the fourth low order character within the A operand register 38 is shifted to the high order character position of the B operand register 40. During each of the read only memory cycles 22, the current contents of the A history register 80 (AH) are decremented.

If the current operation is a TMA order (as it is assumed to be in the present explanation), the read only memory address of the accumulator register (ACCY) is entered into the control memory address register 28 (R) during the corresponding cycle 23; alternatively, the control memory address of a special working location register, i.e. working location register 3, is transferred into the control memory address register (R). At the same time, the contents of the B pointer register 86, BP, are transferred to the control memory address register 28, R, and an incremented version of the B pointer register entered therein.

Also during cycle 23, the contents of the main memory location for which a request was initiated during cycle 16, is transferred from the main memory local register 26 (N) to the D operand register 44. This completes the extraction of the three words of information from main memory and in fact establishes a condition of readiness for the initial transfer of the low order 3 characters of the B operand register to the Y register. After the initial 3 characters have been transferred, there remains a single character of information in the high order position of the B operand register 40, and anywhere from one to four characters of useful information in the A operand register depending upon the original condition of the B pointer register 86 (BP). At the same time, the D operand register has been loaded with the balance of useful information. Thus, it is that the subsequent operative cycles of the read only memory will be utilized to collect another group of three characters of information in the low order three character positions of the B operand register preliminary to the transfer thereof to the control memory. In order to effect this collection operation, use is made of an unconditional branch operation, in that during cycle 23, link flop D (LD) is unconditionally set. This means that upon the next occurrence of a branch on stored test signal, action will be taken to initiate a transfer to the read only memory location corresponding to the contents of the D address register 66 which in the present instance, corresponds to cycle 23 itself. Also, in cycle 23 the B address register 62 is loaded with a read only memory address to be utilized in the branching operation culminating the present order.

As in cycle 22, cycle 24 is directed to a shifting of the useful characters of information into the low order character positions of the A and B operand registers 38 and 40. The contents of the A history register 80 (AH) is utilized to keep track of the information being shifted. In this respect, each character shift in the A operand register 38 is accompanied by a decrementing of the contents of the A history register 80 (AH). This continues until such time as a 00 representation is observed in the low order 2 bit positions of the A history register (AH), indicating that the useful characters of information have been transferred from the A operand register 38 to the B operand register 40. Upon such indication, the contents of the D operand register 44, i.e. the third information word extracted from main memory, are transferred into the A operand register 38.

Also occurring during the read only memory cycle 24 is the loading of a read only memory address (i.e. A10FFA1) into the A address register 60 QA which address will be used in the culmination of the current instruction. A branch on stored test signal is also generated during cycle 24 and will be effective after cycle 25 to recycle through the read only memory locations corresponding to cycles 23, 24 and 25 in response to the unconditional setting of link flop D. It should be apparent that this loop is automatically terminated after a single cycle since the contents of the D address register 66 (QD) are replaced during cycle 25 with the address (i.e. TMA0126) of the next sequential read only memory location, i.e. that corresponding to cycle 26.

Cycle 25 is directed to a duplication of the operations effected in cycle 24 including the shifting of the contents of the A and B registers and the transfer into the high order character position of the B register of the contents of the low order character position of the A register. A conditional transfer of the contents of the D operand register 44 to the A operand register 38 is, as in cycle 24, predicted upon the detection of a binary zero representation in the A history register 80 (AH). During cycle 25, link flop E is unconditionally set (i.e. 0ESET); however, a subsequently occurring branch on stored test signal will effect the selection of the contents of the E address register 68 (QE) only on the condition that all lower order priority link flops are reset.

During cycle 26 there is a continuation of the shifting right of characters in the A and B operand registers 38 and 40 and a transfer of the contents of the low order character location of the A operand register to the high order character location of the B operand register. Also occurring during this cycle is the conditional setting of the link flops A, B, C and D. In this respect, the A link flop is set if the current operation is either floating addition or substraction (i.e. 0AFAS); the B link flop is set if the current operation is floating multiplication (i.e. 0BFMP); the C link flop is set if the current operation is floating division (i.e. DCFDM); and the D link flop is set if the current operation is directed to the loading of a special register used in the performance of scientific operations (i.e. 0DLDL). Further during cycle 26, action is taken to load the D address register 66 (QD) with the address (i.e. A01EAA1) of a read-only memory location corresponding to the conditional operation associated with the D link flop.

In cycle 27, the control memory address of the accumulator register (ACCY) of control memory is transferred into the control memory address register 28 (R) of the current instruction is in the nature of a TMA operation (as has been assumed for purposes of this explanation). Alternatively, the address of working location 6 of control memory is transferred into the control memory address register 28 (R). At the same time, the contents of the B pointed register 86 (BP) are transferred into the control memory address register (R) and the low order three characters of information (i.e. BL) remaining in the B operand register 40 are transferred into the control memory local register (Y) and subsequently restored into the address of control memory designated for storage currently being addressed. At this time, the final branch on stored test signal is generated.

During cycle 30 the control memory address register (R) is loaded with the address of the sequence counter thereof and the contents of the B pointer register 86 (BP) is incremented unitarily. At the conclusion of cycle 30, the branch on stored test operation, initiated during cycle 27, becomes effective whereby the highest ordered one of the A, B, C or D address registers having its associated link flop set, will be used to supply the next succeeding read only memory address.

In an instance, such as was assumed for the present example, where the current operation is in the nature of a TMA order, none of the flip-flops A through D will be set and it will fall upon the D address register 68 (QD) to supply the address of the location addressed during the next succeeding read only memory cycle. In such instances, the TMA operation itself having been completed, the succeeding cycle will be the first extraction cycle of the successive next program instruction as currently specified by the contents of the sequence register of control memory.

The implemenation of the TMA order has been such that a branching operation occurs in accordance with the nature of the operation being conducted; or alternatively as an unconditional transfer to the next succeeding program instruction in an instance where the current operation is complete. This is not to be construed as a limitation of the multiple uses to which the practice of the present invention can be put. While in accordance with the provisions of the statutes, there have been illustrated and described the best forms of the invention known, certain changes may be made in the apparatus described without departing from the spirit of the invention as set forth in the appended claims, and that in some cases, certain features of the invention may be used to advantage without a corresponding use of other features.

Having now described the invention, what is claimed as new and novel and for which it is desired to secure by Letters Patent is:

1. In a data processing apparatus the combination comprising an addressable memory store including a plurality of addressable locations, said store further including a first register connected to said store for storing an address for referencing said addressable memory store locations and a second register for temporarily storing the contents of referenced locations of said addressable memory store, a plurality of independently accessible registers, control means for selectively connecting at least an address portion of the information contents of each of said locations stored in said second register during each of a number of successive operative cycles of said addressable memory store as inputs to at least one of said plurality of independently accessible registers, said control means including a plurality of settable devices corresponding in number to said independently accessible registers and each said settable device associated with a different one of said accessible registers, said control means further including means responsive to test conditions in said associated data processing apparatus to selectively condition respective ones of said settable devices and means coupled to said settable devices and to said second register for selecting the address contents of a particular one of said independently accessible registers corresponding to the selectively conditioned one of said settable devices to specify the address of the next location in said addressable memory to be referenced during a succeeding cycle.

2. In a data processing system capable of effecting a branching operation to any one of a plurality of branch addresses within the execution period of a single program instruction, the combination comprising a memory store including a plurality of addressable memory locations, a plurality of branch address registers each of which stores digitally encoded address information defining address locations within said addressable memory, memory store addressing means connected to said addressable memory, a plurality of bistable devices operatively connected to other portions of said data processing apparatus, each of said bistable devices capable of being independently set in response to conditions existent within said data processing system during the execution of said program instruction, means for operatively associating a particular one of said bistable devices with a particular one of said plurality of branch address registers, and means operative in response to a conditioning signal generated within said data processing system to initiate the transfer of the branch address contents of the branch address register corresponding to a selected "set" one of said bistable devices to said memory store addressing means for use as an address for the subsequent referencing of the corresponding location within said memory store.

3. An electronic data processing apparatus comprising a memory store having a plurality of addressable storage locations therein, means for selectively referencing any one of said plurality of storage locations, a memory store output register connected to the output of said memory store for temporarily storing the contents of a storage location referenced therein, a pluraltiy of branch address registers, means for selectively transferring at least an address portion of the contents of said memory store output register to at least one of said plurality of branch address registers randomly during each of a number of succeeding referencing cycles of said memory store, a plurality of bistable devices each of which is capable of responding to any one of a plurality of conditions existing within said data processing apparatus, one each of said bistable devices being operatively associated with a corresponding one of said branch address registers, and means to sense a particular bit representation in another portion of the content stored in said memory store output register to initiate a scanning of the bistable state of said plurality of bistable devices and said last means including means responsive to the results thereof to effect the transfer to said memory store referencing means of the address contents of a particular one of said branch address registers whose associated bistable device responds to an existing condition to be used as the address of the next memory store location to be referenced.

4. A data processing apparatus capable of effecting a branch on stored test operation whereby indications of conditions within said data processing apparatus being tested are prestored whereafter during a subsequent operative cycle the generation of a branch on stored test signal is effective in selecting on a priority basis a branch address corresponding to a particular one of said prestored test conditions which has been satisfied, said combination comprising an addressable memory store having a plurality of addressable locations and including means for referencing any particular location therein and additional output means for temporarily storing the contents of a referenced location, a plurality of branch address registers operatively connected to said output means of said addressable memory and adapted to selectively store address portions of the output contents of referenced memory locations, said address portions comprising memory addresses to be branched to in the event that a particular condition being sensed is satisfied and provided those conditions allocated a higher priority are not so satisfied, first means operatively connected to various points in the data processing apparatus for providing stored indications representative of the results of conditions established therein by testing, and second means for providing a priority selection of branch addresses being operatively associated said last-named means with particular ones of said branch address registers, said second means in response to the generation of a signal indicative of said branch on stored test operation being effective in establishing as the next address, the address contents of the branch address register corresponding to the stored indication in said first means as determined by said second means as being the highest order priority condition which is established by said testing means as being satisfied.

5. A data processing apparatus including means associated with the memory portion thereof, said means being capable of effecting a branch operation to any one of a plurality of pre-established addresses within said memory portion in accordance with conditions existing within said associated data processing apparatus, said conditions having been tested for and indications of the results stored in the data processing apparatus prior to the initiation of the branch operation, comprising the combination of a memory portion including a plurality of addressable locations and further including addressing means for referencing locations therein and output means for temporarily storing the contents of a memory location referenced therein, a plurality of branch address registers each of which is adapted to store address information defining the address of a possible branch location within said addressable memory portion, means for selectively connecting the output means of said memory portion to said plurality of branch address registers to thereby enable the selective storing of address information defining said possible branch locations therein, means operatively connected with each of said branch registers and settable in response to operative conditions within said data processing apparatus to thereby condition its associated branch address register as the possible source of the succeeding branch location, and scanning means actuated upon detection of a particular bit representation in said data processing apparatus to initiate the transfer of the address contents of particular ones of said plurality of branch address registers conditioned as said source by said means to said addressing means of said addressable memory portion.

6. In a data processing apparatus, the combination comprising a read only memory including a plurality of locations and further including addressing means for referencing the contents of a particular location therein and output means for temporarily storing the contents of a referenced location, a plurality of branch address registers selectively connected to the output means of said read only memory and adapted to store selected address portions of the information contents from referenced ones of said read only memory locations, means connected to said output means and responsive to other portions of said information contents stored in said read only memory locations to test for various conditions within said data processing apparatus during subsequent operative cycles, means operatively connected with each of said branch address registers and being settable in response to the existence of said conditions, and scanning means operative upon detection of a particular bit representation in the information content stored the output means of said read only memory to initiate the scanning of said settable means in accordance with a predetermined priority and to effect the transfer of said address contents of a particular one of said branch address registers to the addressing means of said read only memory to thereby identify the address of the next location to be referenced therein.

7. In a data processing apparatus, the combination comprising an addressable memory store including a plurality of addressable memory locations therein, addressing means connected to said addressable memory store for referencing any one of said addressable memory locations during each operative cycle thereof and output means for temporarily storing the contents of a referenced location, means connected to said output means of said addressable memory store for sensing the contents of each location referenced therein, a plurality of branch address registers, means connecting said memory sensing means to said plurality of branch address registers, logic means including said memory sensing means for sensing and selectively transferring at least an address portion of the informational contents of each of said memory store locations referenced during succeeding operative cycles to respective ones of said branch address registers, said last-named logic means further responsive to another portion of each of the informational contents of memory locations representing test fields referenced during said succeeding operative cycles for establishing conditions within said data processing apparatus to be tested, means operatively connected with each of said branch address registers and said logic means to be settable in accordance with respective conditions determined by testing to be existing within the associated data processing apparatus, and testing means coupled to said output means, said testing means being actuated by a particular bit representation of the informational contents of a memory location referenced subsequent to the loading of said branch address registers and the conditioning of the settable means associated therewith, to scan each of the respective settable means in a predetermined manner until a particular one of said settable means is found to be in its set state and initiate a transfer of the contents of the corresponding branch address register to the addressing means of said memory store.

8. In a data processing apparatus, the combination comprising an addressable read only memory including a plurality of addressable locations, said memory further including addressing means for identifying a location therein to be referenced, and an output register for temporarily storing the contents of a referenced location, incrementing means connected to said read only memory addressing means and adapted to selectively increment or decrement the contents of said read only memory addressing means after each memory cycle and for temporarily storing said incremented or decremented version of said read only memory address used in a preceding cycle for a possible use in the next read only memory cycle, a plurality of branch address registers selectively connected to said output register of said read only memory for storing address portions of the contents of successively referenced read only memory locations corresponding to possible branch locations, a plurality of bistable devices, at least one of which is associated with each of said branch address registers, priority test logic operatively connected to said bistable devices and actuated upon detection of a particular bit representation in the output register of said read only memory indicative of a branch on stored test operation, to scan said plurality of bistable devices in a predetermined manner and initiate the transfer of the contents of the branch location register corresponding to the highest order of priority bistable device found to be in a set state to the address portion of said read only memory for use during said next memory cycle to said in referencing the next location of said read only memory, said incrementing means being coupled to said bistable devices and being conditional when none of said devices are found to be in a set state to supply as a next address to said memory addressing means for the next cycle said incremented or decremented version of the read only memory address utilized in the preceding cycle.

References Cited

UNITED STATES PATENTS

| | | | |
|---|---|---|---|
| 3,400,371 | 9/1968 | Amdahl et al. | 340—172.5 |
| 3,408,630 | 10/1968 | Packard et al. | |
| 3,490,003 | 1/1970 | Herold et al. | |

PAUL J. HENON, Primary Examiner

H. E. SPRINGBORN, Assistant Examiner

UNITED STATES PATENT OFFICE
CERTIFICATE OF CORRECTION

Patent No. 3,570,006 Dated March 9, 1971

Inventor(s) George S. Hoff et al.

It is certified that error appears in the above-identified patent and that said Letters Patent are hereby corrected as shown below:

Column 17, line 34, "responds" should read -- responded --; line 62, "associated" should read -- associating --. Column 18, line 25, after "of", first occurrence, insert -- a --; same line 25, "ones" should read -- one --. Column 20, line 16, "conditional" should read -- conditioned --.

Signed and sealed this 23rd day of May 1972.

(SEAL)
Attest:

EDWARD M.FLETCHER,JR.
Attesting Officer

ROBERT GOTTSCHALK
Commissioner of Patents

›RM PO-1050 (10-69)

USCOMM-DC 60376-P69
★ U.S. GOVERNMENT PRINTING OFFICE : 1969 O—366-334